United States Patent [19]

Albers et al.

[11] Patent Number: 4,549,786
[45] Date of Patent: Oct. 29, 1985

[54] MIRROR ASSEMBLY

[76] Inventors: Joseph H. Albers; Christopher J. Albers, both of 3330 E. Kemper Rd., Cincinnati, Ohio 45241

[21] Appl. No.: 464,661

[22] Filed: Feb. 7, 1983

[51] Int. Cl.⁴ .............................................. G02B 5/10
[52] U.S. Cl. .................................... 350/625; 248/479; 350/631
[58] Field of Search ................ 350/288, 299, 301–304, 350/307, 293; 248/469, 473, 475 R, 474, 476–487, 495

[56] References Cited

U.S. PATENT DOCUMENTS 3,170,985  2/1965  Katulich .............................. 350/299

Primary Examiner—Bruce Y. Arnold
Attorney, Agent, or Firm—James W. Pearce; Roy F. Schaeperklaus

[57] ABSTRACT

A mirror assembly which includes a rubber-like gasket member including spaced aligned openings with continuous slots in inner walls of the openings. Mirror members are mounted in the slots. One of the mirror members can be flat and the other of the mirror members can be spherical. A rigid case supports the gasket. A flange of the case supports side and end strip portions of the gasket member. A body of the case supports a cross strip portion of the gasket member.

7 Claims, 8 Drawing Figures

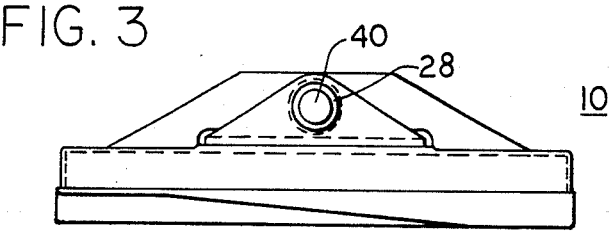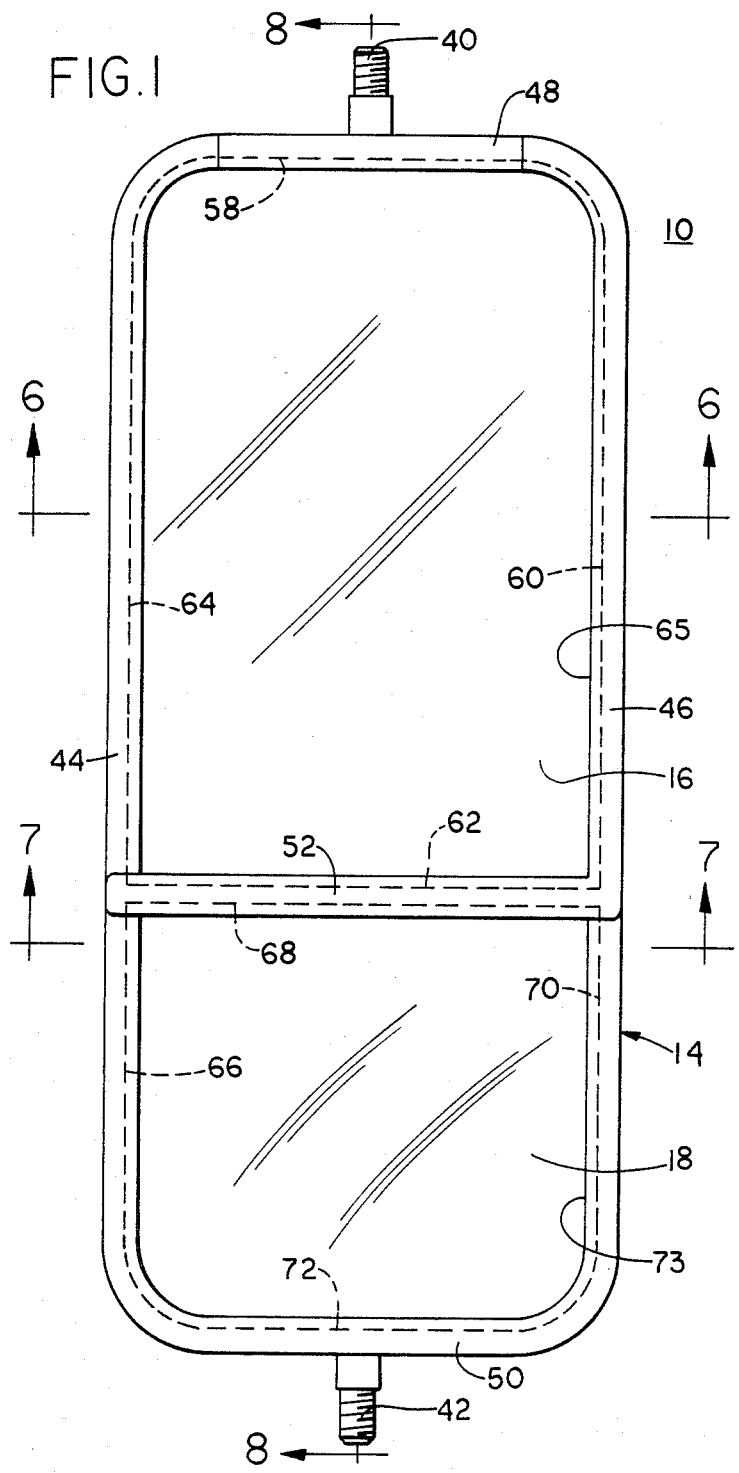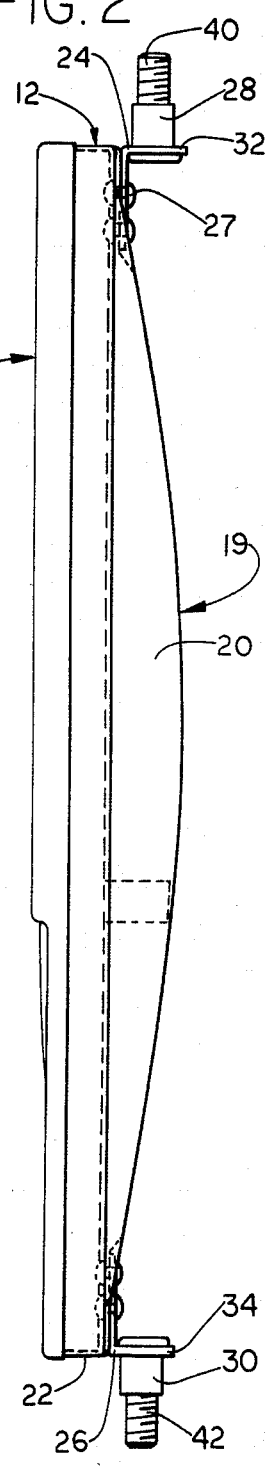

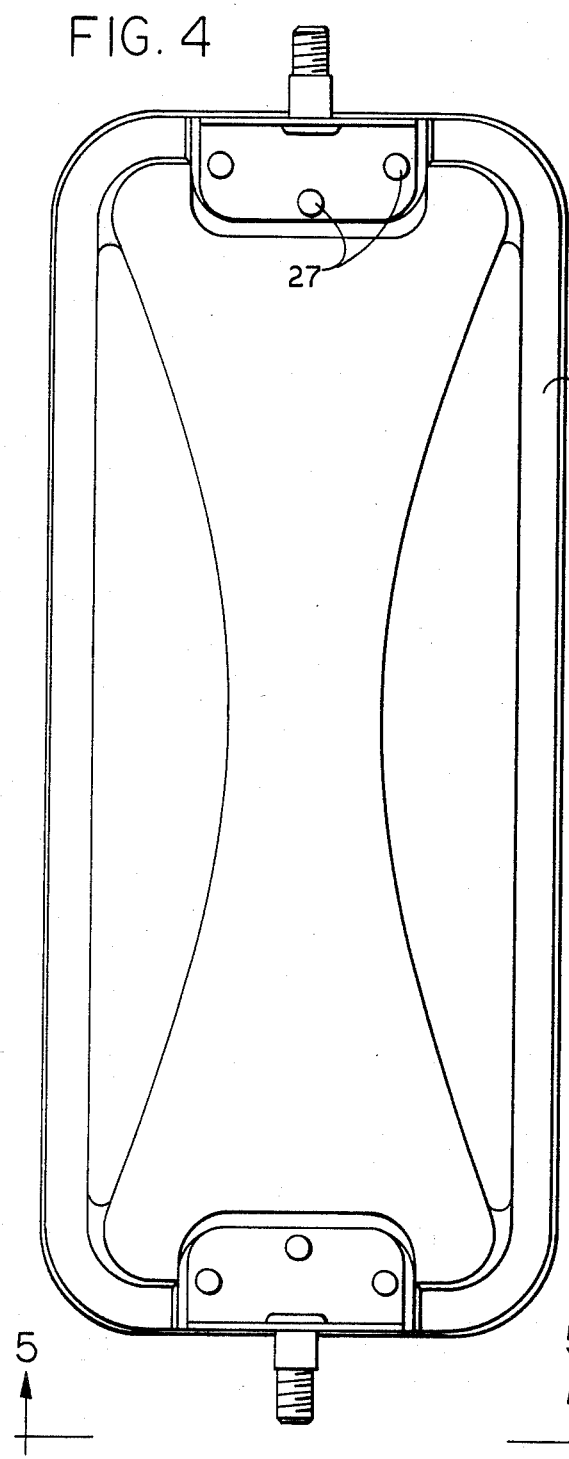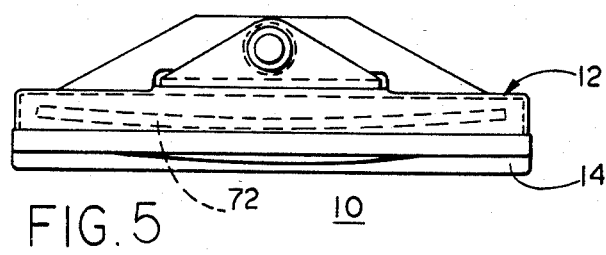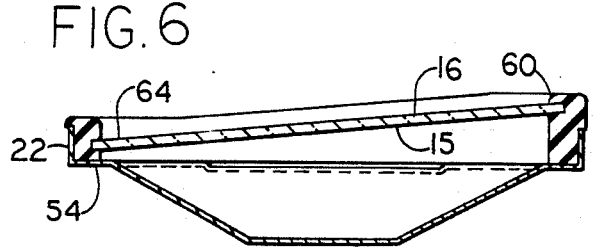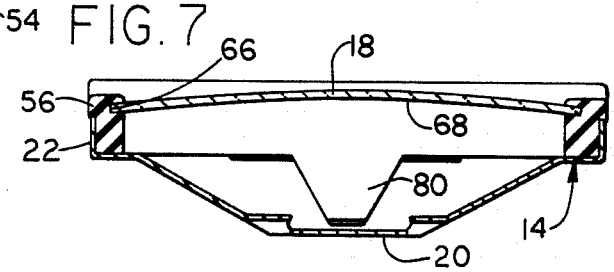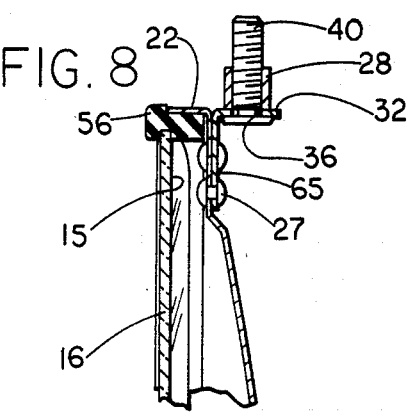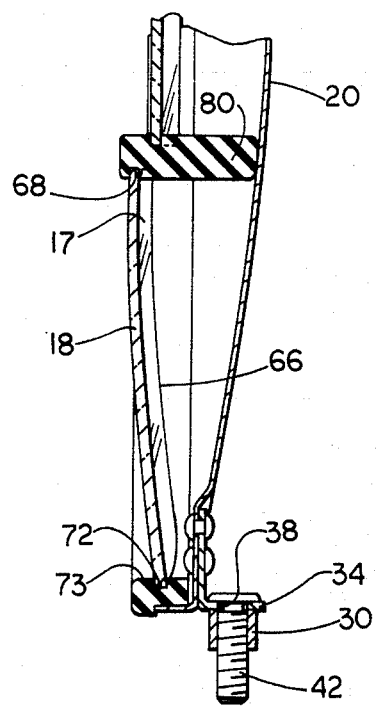

MIRROR ASSEMBLY

This invention relates to a mirror assembly. More particularly, this invention relates to a two-part side mirror assembly for a vehicle.

The invention relates to a rear view mirror assembly which includes a first mirror member having a plane reflecting face and a second mirror member having a convex reflecting face and represents an improvement in the type of mirror assembly shown in Seashore U.S. Pat. No. 3,175,463.

An object of this invention is to provide a rear view mirror assembly which includes a single gasket member having sockets for two reflecting surfaced mirror members which positions the mirror members in selected relative positions.

A further object of this invention is to provide such an assembly in which the gasket member is of resilient material to permit insertion of mirror members in sockets therein and in which the assembly includes a rigid case portion which holds the gasket in position when the mirror members have been inserted in the sockets.

Briefly, this invention provides a first mirror member having a plane reflective surface and a second mirror member having a convex reflective surface. The mirror members are positioned in sockets in a gasket of rubber-like material. The gasket is supported by a case which holds the gasket in position with the mirror members directed in selected relative orientation. The case can be supported by appropriate supports.

The above and other objects and features of the invention will be apparent to those skilled in the art to which this invention pertains from the following detailed description and the drawings, in which:

FIG. 1 is a view in front elevation of a mirror assembly constructed in accordance with an embodiment of this invention;

FIG. 2 is a view in end elevation of the mirror assembly shown in FIG. 1;

FIG. 3 is a top plan view of the mirror assembly;

FIG. 4 is a view in rear elevation of the mirror assembly;

FIG. 5 is a bottom plan view of the mirror assembly looking in the direction of the arrows 5—5 in FIG. 4;

FIG. 6 is a view in section taken on the line 6—6 in FIG. 1;

FIG. 7 is a view in section taken generally on the line 7—7 in FIG. 1, partly broken away to show details of structure; and FIG. 8 is a view in section taken on the line 8—8 in FIG. 1.

In the following detailed description and the drawings, like reference characters indicate like parts.

In FIGS. 1-5 inclusive is shown a mirror assembly 10 constructed in accordance with an embodiment of this invention. The mirror assembly 10 includes a case 12, a gasket member 14 and mirror members 16 and 18. The mirror member 16 has an interior flat reflecting face 15. The mirror member 18 has an interior reflecting face 17, which is a portion of a sphere.

The case 12 includes a main body 19 which can be stamped to include a back panel 20 and a peripheral flange 22. Angle-shaped brackets 24 and 26 are attached to upper and lower end portions, respectively, of the back panel 20 by rivets 27. Tubular fittings 28 and 30 are mounted on flanges 32 and 34 of the brackets 24 and 26, respectively, in opposed relation to openings 36 and 38 in the flanges 32 and 34, respectively. Fasteners 40 and 42 can be mounted in the fittings 28 and 30, respectively, for use in mounting the mirror assembly on a vehicle, not shown.

The gasket member 14 is generally rectangular and includes side strip portions 44 and 46, end strip portions 48 and 50, and a cross strip portion 52. The cross strip portion 52 spans the side strip portions 44 and 46 parallel to and spaced from the end strip portions 48 and 50. The side strip portions 44 and 46 and the end strip portions 48 and 50 can be adhesively attached to the peripheral flange 22 and to a flat plane portion 54 of the main body 19.

A peripheral shoulder 56 on the gasket 14 overlies an outer edge of the peripheral flange 22. Slot portions 58, 60, 62 and 64 in the end strip portion 48, the side portion 46, the cross strip portion 52 and the side strip portion 44 receive edge portions of the mirror member 16 and form a continuous inwardly opening slot in inner walls of an opening 65 formed in the gasket member 14. Slot portions 66, 68, 70 and 72 in the side strip portion 44, the cross strip portion 52, the side strip portion 46, and the end strip portion 50 receive edge portions of the mirror member 18 and form a continuous inwardly opening slot in inner walls of an opening 73 formed in the gasket member 14. As shown in FIGS. 8, 7 and 5, the slot portions 66, 68 and 72 are curved to follow the curvature of the edge portions of the mirror member 18, and the slot portion 70 (not shown in detail) can be curved similarly to the slot portion 66.

A boss 80 on the cross strip portion 52 engages the back panel 20 and can be adhesively attached thereto to maintain the cross strip portion 52 of the gasket and the mirror members 16 and 18 in fixed relation to the case 12.

The mirror members both face the same general direction, and the mirror assembly can be mounted adjacent a window of a vehicle (not shown) so that the flat mirror 16 reflects the area immediately behind the mirror assembly and the spherically curved mirror reflects a wide arc of space behind the mirror assembly.

The mirror assembly illustrated in the drawings and described above is subject to structural modification without departing from the spirit and scope of the appended claims.

Having described our invention, what we claim as new and desire to secure by Letters Patent is:

1. A mirror assembly which comprises; a gasket member of rubber-like material which includes spaced parallel side strip portions, spaced parallel end strip portions, and a cross strip portion parallel to and spaced between the end strip portions and spanning the side strip portions to form two openings therein, there being lengthwise slot portions in the side strip portions, the end strip portions, and the cross strip portion to form a respective continuous slot in the inner walls around each of the openings; mirror members, each mirror member respectively mounted in a respective opening and in the continuous slot around it; and a rigid case having flange means supporting the side strip portions and the end strip portions and a body supporting the cross strip portion to hold the mirror members and the gasket member in fixed relation to the case.

2. A mirror assembly as in claim 1 in which one of the mirror members has a flat reflective face and the other of the mirror members has a spherical reflective face, and the respective continuous slot receiving the other mirror member is curved to the spherical curvature of the reflective face of said other mirror member.

3. A mirror assembly as in claim 2 in which the mirror members are directed in the same general direction.

4. A mirror assembly which comprises a gasket member of rubber-like material which includes spaced side strip portions, spaced end strip portions, and a cross strip portion spaced between the end strip portions and spanning the side strip portions to form two openings therein, there being lengthwise slot portions in the side strip portions, the end strip portions, and the cross strip portion to form a respective slot in the respective inner walls around each of the openings, mirror members, each mirror member respectively mounted in a respective opening and in the slot around it, and a rigid case having flange means supporting the side strip portions and the end strip portions and a body supporting the cross strip portion to hold the mirror members and the gasket member in fixed relation to the case.

5. A mirror assembly which comprises; a gasket member of rubber-like material which includes spaced side strip portions, spaced end strip portions, and a cross strip portion spaced between the end strip portions and spanning the side strip portions to form two openings therein, there being lengthwise slot portions in the side strip portions, the end strip portions, and the cross strip portion to form a respective slot in the respective inner walls around each of the openings, mirror members, each mirror member respectively mounted in a respective opening and in the slot around it; and a rigid case having peripheral flange means annularly, together with an adjacent planar margin portion of the body, supporting the side strip portions and the end strip portions and a central portion of the body supporting the cross strip portion to hold the mirror members and the gasket member in fixed relation to the case.

6. A mirror assembly as in claim 5 in which the side strip portions and end strip portions of the gasket member are adhered to the flange means of the case.

7. A mirror assembly as in claim 5 in which the gasket member has a peripheral flange overlying the outer edge of the peripheral flange means of the case.

* * * * *